United States Patent
Cui et al.

(10) Patent No.: US 11,254,854 B2
(45) Date of Patent: Feb. 22, 2022

(54) SURFACTANT FOR ENHANCED OIL RECOVERY

(71) Applicant: TOTAL SE, Courbevoie (FR)

(72) Inventors: Leyu Cui, Pau (FR); Maurice Bourrel, Pau (FR); Fabienne Dubos, Biron (FR); Alexandra Klimenko, Pau (FR)

(73) Assignee: TOTALENERGIES SE, Courbevoie (FR)

( * ) Notice: Subject to any disclaimer, the term of this patent is extended or adjusted under 35 U.S.C. 154(b) by 0 days.

(21) Appl. No.: 16/483,367

(22) PCT Filed: Feb. 6, 2018

(86) PCT No.: PCT/EP2018/052977
§ 371 (c)(1),
(2) Date: Aug. 2, 2019

(87) PCT Pub. No.: WO2018/146107
PCT Pub. Date: Aug. 16, 2018

(65) Prior Publication Data
US 2020/0010756 A1    Jan. 9, 2020

(30) Foreign Application Priority Data
Feb. 7, 2017  (WO) .................. PCT/IB2017/000232

(51) Int. Cl.
 C09K 8/584  (2006.01)
 C09K 8/594  (2006.01)
 E21B 43/22  (2006.01)
 E21B 43/16  (2006.01)

(52) U.S. Cl.
 CPC .............. *C09K 8/584* (2013.01); *C09K 8/594* (2013.01)

(58) Field of Classification Search
 CPC ...... C09K 8/584; C09K 8/86; C09K 2208/30; C09K 8/60; C09K 8/74; C09K 8/62; C09K 3/00; E21B 43/16; E21B 43/26; E21B 43/20; E21B 43/25; E21B 21/068; E21B 43/38
 See application file for complete search history.

(56) References Cited

U.S. PATENT DOCUMENTS

| | | |
|---|---|---|
| 2008/0039345 A1 | 2/2008 | Kippie et al. |
| 2014/0131046 A1 | 5/2014 | Al-Otaibi et al. |
| 2015/0034310 A1 | 2/2015 | Brennecke et al. |

FOREIGN PATENT DOCUMENTS

| | | |
|---|---|---|
| CN | 101173166 | 5/2008 |
| CN | 104975829 | 10/2015 |
| CN | 106350052 | 1/2017 |
| WO | WO 2013/043838 | 3/2013 |

OTHER PUBLICATIONS

Elhag, et al. "Switchable diamine surfactants for CO2 mobility control in enhanced oil recovery and sequestration", Energy Procdia, vol. 63 (2014), pp. 7709-7716.
Zhang, et al. "CO2-switchable wormlike micelles", Chem. Comnun., RSC Publishing, vol. 49 (2013), pp. 4902-4904.
First Office Action in Chinese Application No. 201880010490, dated Feb. 3, 2021, in 43 pages.
Zhang et al. "Smart use of tertiary amine to design CO2-triggered viscoelastic fluids" Colloid & Polymer Science, Springer Verlag, Heidelberg, DE, vol. 293, No. 2, Oct. 15, 2014, pp. 357-367.
International Search Report for International App. No. PCT/EP2018/052977, dated Mar. 20, 2018, in 3 pages.

*Primary Examiner* — Zakiya W Bates
(74) *Attorney, Agent, or Firm* — Knobbe, Martens, Olson & Bear LLP (57) ABSTRACT

A method of extracting hydrocarbons from a subterranean formation includes injecting a surfactant composition into the subterranean formation and collecting hydrocarbons displaced by the injected surfactant composition. The surfactant composition can have at least one polyamine surfactant compound of formula $R1R2NA(RNA)_xNR3R4$, where x is an integer from 0 to 3, R1, R2, R3, R4 and each R are independently a hydrogen atom or an alkyl group, each A is an alkylene group, and the total number of carbon atoms in the surfactant compound is from 10 to 21. The surfactant composition can include liquid or supercritical carbon dioxide.

12 Claims, 3 Drawing Sheets

SURFACTANT FOR ENHANCED OIL RECOVERY

TECHNICAL FIELD

The present invention relates to the use of surfactant compounds in enhanced oil recovery processes, more particularly using liquid or preferably supercritical carbon dioxide.

TECHNICAL BACKGROUND

Hydrocarbons in an underground reservoir can be recovered or produced by means of one or more wells drilled in the reservoir. Before production begins, the formation (a porous medium) is saturated with hydrocarbons.

The initial recovery of hydrocarbons is generally carried out by techniques of "primary recovery", in which only the natural forces present in the reservoir are relied upon. In this primary recovery, only part of the hydrocarbons is ejected from the pores by the pressure of the formation. Typically, once the natural forces are exhausted and primary recovery is completed, water or gas is injected for maintaining the pressure in the reservoirs and recovering more hydrocarbons as "secondary recovery". Usually there is still a large volume of hydrocarbons left in the reservoir, generally more than two thirds, at the end of the "secondary recovery".

This phenomenon has been known for a long time and has led to the development of many techniques of enhanced oil recovery (EOR). Many of these techniques rely on the injection of a fluid into the underground reservoir (or subterranean formation) in order to produce an additional quantity of e.g. crude oil. The fluid used can be water, steam, carbon dioxide, natural gas, nitrogen, etc.

In particular, the injection of carbon dioxide, preferably in the supercritical state, provides a number of advantages. First, reservoir pressure is maintained. Second, oil viscosity is reduced: as carbon dioxide is miscible with oil, the oil expands and swells when put in contact with carbon dioxide. Third, oil displacement is improved because the interfacial tension between oil and water is reduced.

Furthermore, carbon dioxide EOR provides an opportunity for carbon dioxide storage or sequestration underground, which is advantageous since carbon dioxide is considered the primary contributor to the increase in the levels of greenhouse gases in the atmosphere, causing a concern about climate change.

One of the main challenges of carbon dioxide EOR is the early breakthrough of carbon dioxide due to its physical properties. The viscosity of carbon dioxide is low relative to the targeted oil, causing viscous fingering and low oil recovery. Also, the low density of carbon dioxide results in gravity override where carbon dioxide rises to the top parts of the porous medium without contacting the targeted oil.

Mitigation of these issues can be achieved by the addition of small amounts of surfactants to generate carbon dioxide/water emulsions (sometimes also referred to as "foams"). Emulsions have a relatively high viscosity, which makes it possible to prevent or limit viscous fingering and gravity override.

However, the selection of appropriate surfactants is difficult. Non-ionic surfactants tend not to work well at high temperature and high salinity conditions. Anionic surfactants generally cause adsorption issues on minerals. And cationic surfactants tend to have a low solubility in carbon dioxide.

The article entitled "Switchable Nonionic to Cationic Ethoxylated Amine Surfactants for $CO_2$ Enhanced Oil Recovery in High-Temperature, High-Salinity Carbonate Reservoirs" by Chen et al., with the reference SPE-154222-PA (2014), as well as the article entitled "Mobility of Ethomeen C12 and Carbon Dioxide ($CO_2$) Foam at High Temperature/High Salinity and in Carbonate Cores" by Cui et al., with the reference SPE-179726-PA (2016), both disclose the use of ethoxylated monoamine compounds for carbon dioxide EOR.

The article entitled "Switchable diamine surfactants for $CO_2$ mobility control in enhanced oil recovery and sequestration" by Elhag et al., in Energy Procedia 63:7709-7716 (2014) discloses the use of ethoxylated diamine compounds for carbon dioxide EOR.

The PhD thesis entitled "Selection of Switchable Amine Surfactants for Stable $CO_2$-in-Water Foams for High Temperature $CO_2$ Mobility Control" by Elhag, The University of Texas at Austin (2016), discloses the use of an alkyl ditertiary amine for carbon dioxide EOR, wherein the amine compound comprises more than 22 carbon atoms.

However, these surfactants are not fully satisfactory. There is still a need for surfactants which provide higher efficiency in carbon dioxide EOR.

SUMMARY OF THE INVENTION

It is a first object of the invention to provide a method of extracting hydrocarbons from a subterranean formation, comprising:
injecting a surfactant composition into the subterranean formation, and
collecting hydrocarbons displaced by the injected surfactant composition;
wherein the surfactant composition comprises at least one surfactant compound of formula (I):

wherein x is an integer from 0 to 3, $R_1$, $R_2$, $R_3$, $R_4$ and each R are independently a hydrogen atom or an alkyl group, each A is an alkylene group, and the total number of carbon atoms in the surfactant compound of formula (I) is from 10 to 21.

According to some embodiments, the total number of carbon atoms in the surfactant compound of formula (I) is from 12 to 20, preferably from 15 to 20, and more preferably from 17 to 19.

According to some embodiments, x is 0.

According to some embodiments, each R is a hydrogen atom.

According to some embodiments, each A comprises from 1 to 5 carbon atoms, preferably from 2 to 4 carbon atoms, and more preferably comprises 3 carbon atoms.

According to some embodiments, at least one of $R_1$, $R_2$, $R_3$ and $R_4$ is a hydrogen atom.

According to some embodiments, at least one of $R_1$, $R_2$, $R_3$ and $R_4$ is an alkyl group comprising from 8 to 16 carbon atoms, preferably from 10 to 15 carbon atoms, and more preferably from 12 to 14 carbon atoms.

According to some embodiments, $R_1$, $R_2$, $R_3$ and $R_4$ are independently selected from a hydrogen atom and linear alkyl groups.

According to some embodiments, at least one, and preferably two, of $R_1$, $R_2$, $R_3$ and $R_4$ is/are a methyl group.

According to some embodiments, x is 0, A comprises 3 carbon atoms, $R_1$ is an alkyl group comprising from 6 to 16 carbon atoms, $R_2$ is a hydrogen atom, $R_3$ is a methyl group and $R_4$ is a methyl group.

According to some embodiments, $R_1$ is an alkyl group comprising at least 8 carbon atoms, preferably from 10 to 16 carbon atoms, more preferably from 12 to 14 carbon atoms, and most preferably 12 carbon atoms.

According to some embodiments, the surfactant composition comprises a single surfactant compound of formula (I).

According to some embodiments, the single surfactant compound of formula (I) is selected from $N^1$-dodecyl-$N^3$,$N^3$-dimethylpropane-1,3-diamine, $N^1$-dodecyl-$N^1$,$N^3$,$N^3$-trimethylpropane-1,3-diamine, $N^1$-(2,2-diethyloctyl)-$N^3$,$N^3$-dimethylpropane-1,3-diamine, $N^1$-octyl-$N^3$,$N^3$-dimethylpropane-1,3-diamine, $N^1$-decyl-$N^3$,$N^3$-dimethylpropane-1,3-diamine and $N^1$-tetradecyl-$N^3$,$N^3$-dimethylpropane-1,3-diamine.

According to some embodiments, the surfactant composition comprises a plurality of surfactant compounds of formula (I).

According to some embodiments, the surfactant composition comprises a plurality of compounds of formula (I), wherein x is 0, A comprises 3 carbon atoms, $R_1$ is a linear alkyl group ranging from 8 to 16 carbon atoms, or from 12 to 14 carbon atoms, $R_2$ is a hydrogen atom, $R_3$ is a methyl group and $R_4$ is a methyl group.

According to some embodiments, the surfactant composition comprises at least one additional surfactant which is not according to formula (I), preferably selected from cationic and/or nonionic surfactants.

According to some embodiments, the concentration of surfactant compound(s) of formula (I) in the surfactant composition is from 500 to 50,000 ppm, preferably from 1,000 to 20,000 ppm (w/v).

According to some embodiments, the surfactant composition is an aqueous solution.

According to some embodiments, the aqueous solution is a buffered aqueous solution.

According to some embodiments, the aqueous solution contains inorganic salts, preferably selected from sodium chloride, sodium sulfate, sodium nitrate and/or sodium bromide.

According to some embodiments, the surfactant composition comprises liquid or supercritical carbon dioxide.

According to some embodiments, at least one step of injecting liquid or supercritical carbon dioxide into the subterranean formation.

According to some embodiments, the method comprises successive or alternating steps of injecting one or more aqueous solutions and of injecting liquid or supercritical carbon dioxide into the subterranean formation.

According to some embodiments, the injecting step(s) are carried out via at least one injection well, and the step(s) of collecting hydrocarbons are carried out via at least one production well.

According to some embodiments, the method comprises steps of simultaneously injecting one or more aqueous solutions and of injecting liquid or supercritical carbon dioxide into the subterranean formation.

According to some embodiments, the at least one surfactant of formula (I) is present in one or more of the aqueous solutions; and/or is present in the liquid or supercritical carbon dioxide.

According to some embodiments, the method comprises steps of injecting different aqueous solutions having different salinities.

According to some embodiments, one or more of the aqueous solutions comprise inorganic salts, preferably selected from sodium chloride, sodium sulfate, sodium nitrate and/or sodium bromide.

According to some embodiments, the method comprises steps of simultaneously, successively or alternatively injecting liquid or supercritical carbon dioxide comprising the at least one surfactant of formula (I), and brine, into the subterranean formation, wherein the salinity of the brine preferably varies over time.

According to some embodiments, the method comprises steps of simultaneously, successively or alternatively injecting liquid or supercritical carbon dioxide, and brine comprising the at least one surfactant of formula (I), into the subterranean formation, wherein the salinity of the brine preferably varies over time.

According to some embodiments, the method comprises steps of simultaneously, successively or alternatively injecting liquid or supercritical carbon dioxide, brine, as well as an aqueous solution comprising the at least one surfactant of formula (I), into the subterranean formation, wherein the salinity of the brine preferably varies over time.

The invention also relates to a composition comprising liquid or supercritical carbon dioxide and at least one surfactant compound of formula (I):

$$R_2\diagdown N-A(-N-A)_x-N\diagup R_3 \atop R_1\diagup \quad\;\; R \quad\quad\;\diagdown R_4 \tag{I}$$

wherein x is an integer from 0 to 3, $R_1$, $R_2$, $R_3$, $R_4$ and each R are independently a hydrogen atom or an alkyl group, each A is an alkylene group, and the total number of carbon atoms in the surfactant compound of formula (I) is from 10 to 21.

According to some embodiments, the composition is in the form of a liquid or supercritical carbon dioxide/water emulsion.

According to some embodiments, the total number of carbon atoms in the surfactant compound of formula (I) is from 12 to 20, preferably from 15 to 20, and more preferably from 17 to 19.

According to some embodiments, x is 0.

According to some embodiments, each R is a hydrogen atom.

According to some embodiments, each A comprises from 1 to 5 carbon atoms, preferably from 2 to 4 carbon atoms, and more preferably comprises 3 carbon atoms.

According to some embodiments, at least one of $R_1$, $R_2$, $R_3$ and $R_4$ is a hydrogen atom.

According to some embodiments, at least one of $R_1$, $R_2$, $R_3$ and $R_4$ is an alkyl group comprising from 10 to 16 carbon atoms, preferably from 11 to 15 carbon atoms, and more preferably from 12 to 14 carbon atoms.

According to some embodiments, $R_1$, $R_2$, $R_3$ and $R_4$ are selected from a hydrogen atom and linear alkyl groups.

According to some embodiments, at least one, and preferably two, of $R_1$, $R_2$, $R_3$ and $R_4$ is/are a methyl group.

According to some embodiments, x is 0, A comprises 3 carbon atoms, $R_1$ is an alkyl group comprising from 6 to 16 carbon atoms, $R_2$ is a hydrogen atom, $R_3$ is a methyl group and $R_4$ is a methyl group.

According to some embodiments, $R_1$ is an alkyl group comprising at least 8 carbon atoms, preferably from 10 to 16 carbon atoms, more preferably from 12 to 14 carbon atoms, and most preferably 12 carbon atoms.

According to some embodiments, the surfactant composition comprises a single surfactant compound of formula (I).

According to some embodiments, the single surfactant compound of formula (I) is selected from $N^1$-dodecyl-$N^3$,$N^3$-dimethylpropane-1,3-diamine, $N^1$-dodecyl-$N^1$,$N^3$,$N^3$-trimethylpropane-1,3-diamine, $N^1$-(2,2-diethyloctyl)-$N^3$,$N^3$-dimethylpropane-1,3-diamine, $N^1$-octyl-$N^3$,$N^3$-dimethylpropane-1,3-diamine, $N^1$-decyl-$N^3$,$N^3$-dimethylpropane-1,3-diamine and $N^1$-tetradecyl-$N^3$,$N^3$-dimethylpropane-1,3-diamine.

According to some embodiments, the surfactant composition comprises a plurality of surfactant compounds of formula (I).

According to some embodiments, the surfactant composition comprises a plurality of compounds of formula (I), wherein x is 0, A comprises 3 carbon atoms, $R_1$ is a linear alkyl group ranging from 8 to 16 carbon atoms, preferably from 12 to 14 carbon atoms, $R_2$ is a hydrogen atom, $R_3$ is a methyl group and $R_4$ is a methyl group.

According to some embodiments, the surfactant composition comprises at least one additional surfactant which is not according to formula (I), preferably selected from cationic and/or nonionic surfactants.

According to some embodiments, the concentration of surfactant compound(s) of formula (I) in the surfactant composition is from 500 to 50,000 ppm, preferably from 1,000 to 20,000 ppm (w/v).

The present invention makes it possible to overcome the drawbacks of the prior art. In particular, the invention provides surfactant compounds which are suitable for carbon dioxide EOR.

Some important requirements for a surfactant useful in carbon dioxide EOR are the following:
Good chemical stability.
Good thermal stability, desirably up to a temperature of at least 90° C., or 100° C., or even 110° C.
Low adsorption on minerals present in the subterranean formation, and in particular carbonate minerals.
High solubility in carbon dioxide, including at high temperature of more than 100° C.
High solubility in water, especially at high temperature of more than 100° C., especially in a wide range of pH of 3-7, and especially at a high salinity of e.g. more than 200,000 ppm.
A satisfactory partitioning coefficient between water and carbon dioxide.

The surfactant compounds of the invention meet some and advantageously all of these requirements.

In some embodiments, the surfactant compounds of the invention make it possible to more effectively generate carbon dioxide/water emulsions (also referred to as "foams") than prior art surfactants, especially at high temperature and high salinity, thereby achieving a larger and/or quicker increase in apparent viscosity.

DESCRIPTION OF EMBODIMENTS

The invention will now be described in more detail without limitation in the following description.
Surfactant Compounds of Formula (I)
The invention relies on the use of at least one surfactant compound of formula (I):

in carbon dioxide EOR. In this formula, x is an integer from 0 to 3, $R_1$, $R_2$, $R_3$, $R_4$ and each R are independently a hydrogen atom or an alkyl group, each A is an alkylene group, and wherein the total number of carbon atoms in the surfactant compound of formula (I) is from 10 to 21.

Each alkyl group in the compound can be linear or branched.

Each alkylene group A can be linear or branched and is preferably linear.

The alkyl and alkylene groups are non-substituted. Therefore, the alkyl groups are of the generic formula —$C_nH_{2n+1}$, where n is an integer, and the alkylene groups A have the formula —$C_nH_{2n}$—, where n is an integer.

According to some embodiments, the total number of carbon atoms is 11, or 12, or 13, or 14, or 15, or 16, or 17, or 18, or 19, or 20, or 21. Preferred ranges of carbon atoms are from 15 to 20, preferably from 16 to 19, and more preferably from 17 to 19.

According to some embodiments x is 0, or 1, or 2, or 3. Preferably x is from 0 to 2, or from 0 to 1. Most preferably x is 0, so that the compound of formula (I) is a diamine.

If x is not 0, preferably each R in formula (I) is a hydrogen atom.

If x is not 0, the various groups A can be identical or different. They are preferably identical.

In some embodiments, each group A (or the group A if x=0) may comprise 1 carbon atom, or 2 carbon atoms, or 3 carbon atoms, or 4 carbon atoms, or 5 carbon atoms, or 6 carbon atoms. Number of carbon atoms of 1 to 5 and 2 to 4 are preferred. More preferably, A is —$C_3H_6$—. Most preferably, x=0 and A is —$C_3H_6$—.

In some embodiments, at least one of $R_1$, $R_2$, $R_3$ and $R_4$ is a hydrogen atom. Preferably, only one among $R_1$, $R_2$, $R_3$ and $R_4$ is a hydrogen atom, and the other three are alkyl groups. In such a case, when x=0, the compound is a diamine compound comprising both a secondary amine function and a tertiary amine function.

The alkyl groups among $R_1$, $R_2$, $R_3$ and $R_4$ can be linear and/or branched. According to some preferred embodiments, one (and only one) of the alkyl groups among $R_1$, $R_2$, $R_3$ and $R_4$ is branched. According to other preferred embodiments, all the alkyl groups among $R_1$, $R_2$, $R_3$ and $R_4$ are linear.

Preferably, one and only one among $R_1$, $R_2$, $R_3$ and $R_4$ is a hydrogen atom. Therefore, in some preferred embodiments, one and only one of $R_1$, $R_2$, $R_3$ and $R_4$ is a hydrogen atom and one and only one of $R_1$, $R_2$, $R_3$ and $R_4$ is a branched alkyl group. In other preferred embodiments, one and only one of $R_1$, $R_2$, $R_3$ and $R_4$ is a hydrogen atom and the other three of $R_1$, $R_2$, $R_3$ and $R_4$ are linear alkyl groups.

Preferably, one (and only one) of $R_1$, $R_2$, $R_3$ and $R_4$ is an alkyl group having a relatively long carbon chain, i.e. comprises at least 6 carbon atoms. The long chain alkyl group preferably comprises at least 7, or at least 8, or at least 9, or at least 10, or at least 11, or at least 12 carbon atoms. Preferred numbers of carbon atoms for this group may range from 8 to 16, or from 10 to 16, or from 11 to 15, or from 12 to 14.

Alternatively, two of $R_1$, $R_2$, $R_3$ and $R_4$ are alkyl groups having a relatively long carbon chain (i.e. containing at least 6 carbon atoms, possibly at least 7 carbon atoms or at least 8 carbon atoms). In this case, the long chain alkyl groups are preferably geminal, i.e. they can be $R_1$ and $R_2$, or $R_3$ and $R_4$.

Preferably, the other groups among $R_1$, $R_2$, $R_3$ and $R_4$ are hydrogen atoms or short chain alkyl groups, i.e. alkyl groups comprising 1 to 3 carbon atoms, preferably 1 to 2 carbon atoms, and most preferably a single carbon atom (i.e. methyl groups).

In one preferred embodiment, one among $R_1$, $R_2$, $R_3$ and $R_4$ is a hydrogen atom, one among $R_1$, $R_2$, $R_3$ and $R_4$ is a long chain alkyl group as defined above, and the other two among $R_1$, $R_2$, $R_3$ and $R_4$ are short chain alkyl groups as defined above, and more preferably methyl groups.

In another preferred embodiment, two among $R_1$, $R_2$, $R_3$ and $R_4$ are long chain alkyl groups as defined above, and the other two among $R_1$, $R_2$, $R_3$ and $R_4$ are short chain alkyl groups as defined above, and more preferably methyl groups.

One preferred subgroup of compounds useful in the invention are those of formula (II):

(II)

wherein A, $R_1$, $R_2$, $R_3$ and $R_4$ are as defined above. Examples of preferred compounds of formula (II) are those listed in the table below:

| Compound No. | A | $R_1$ | $R_2$ | $R_3$ | $R_4$ |
|---|---|---|---|---|---|
| 1 | $C_3H_6$ | octyl | hydrogen | methyl | methyl |
| 2 | $C_3H_6$ | nonyl | hydrogen | methyl | methyl |
| 3 | $C_3H_6$ | decyl | hydrogen | methyl | methyl |
| 4 | $C_3H_6$ | undecyl | hydrogen | methyl | methyl |
| 5 | $C_3H_6$ | dodecyl | hydrogen | methyl | methyl |
| 6 | $C_3H_6$ | tridecyl | hydrogen | methyl | methyl |
| 7 | $C_3H_6$ | tetradecyl | hydrogen | methyl | methyl |
| 8 | $C_3H_6$ | pentadecyl | hydrogen | methyl | methyl |
| 9 | $C_3H_6$ | hexadecyl | hydrogen | methyl | methyl |
| 10 | $C_3H_6$ | 2,2-diethyloctyl | hydrogen | methyl | methyl |
| 11 | $C_3H_6$ | octyl | methyl | methyl | methyl |
| 12 | $C_3H_6$ | nonyl | methyl | methyl | methyl |
| 13 | $C_3H_6$ | decyl | methyl | methyl | methyl |
| 14 | $C_3H_6$ | undecyl | methyl | methyl | methyl |
| 15 | $C_3H_6$ | dodecyl | methyl | methyl | methyl |
| 16 | $C_3H_6$ | tridecyl | methyl | methyl | methyl |
| 17 | $C_3H_6$ | tetradecyl | methyl | methyl | methyl |
| 18 | $C_3H_6$ | pentadecyl | methyl | methyl | methyl |
| 19 | $C_3H_6$ | 2,2-diethyloctyl | methyl | methyl | methyl |

EOR Process

According to the invention, a surfactant composition is used in the context of an EOR process, in which hydrocarbons in gaseous and/or liquid phase are recovered from a subterranean formation. The subterranean formation may in particular be a carbonated reservoir. Water within the subterranean formation may have a salinity of 0 to 200 or even 250 g/L, preferably of 100 to 200 or 250 g/L, and more preferably of 150 to 200 or 250 g/L. Salinity is defined herein as the total concentration of dissolved inorganic salts in water, including e.g. NaCl, $CaCl_2$, $MgCl_2$, $Na_2SO_4$, NaBr, $NaNO_3$ and any other inorganic salts.

The temperature within the subterranean formation may range from 25 to 140° C., preferably from 80 to 140° C. and more preferably from 100 to 120° C.

The permeability of at least a portion of the subterranean formation may range from 5 to 2000 md, preferably from 10 to 1000 md and more preferably from 100 to 1000 md, as estimated by well log.

The process may comprise injecting an aqueous solution (such as water or brine) and/or injecting carbon dioxide in the liquid state or preferably in the supercritical state into the subterranean formation. Preferably, said injection is performed via one or several injecting wells, while hydrocarbon collection is performed via one or more production wells.

Preferably both an aqueous solution and carbon dioxide are injected into the subterranean formation. In particular, separate steps or alternating steps of aqueous solution injection and carbon dioxide injection can be provided. Alternatively, the aqueous solution and carbon dioxide can be injected simultaneously, be it via different injection wells or via the same injection well(s). In the latter case, they can be injected via distinct inlets within a same injection well. Alternatively, the aqueous solution and the carbon dioxide can be premixed and injected as one composition via the same inlet(s), although this is generally not preferred due to the high pressure drop generated by the carbon dioxide/water emulsion in the well(s).

Carbon dioxide/water emulsions which are either generated in situ or premade are preferably characterized by a carbon dioxide/water volume fraction ratio of more than 1.

In the invention, at least one surfactant compound of formula (I) is added to at least one of the above streams of aqueous solution and/or carbon dioxide, so as to make a surfactant composition, prior to injection. The injection of the surfactant composition may be performed at a pressure of from 72.9 to 300 bar, preferably from 100 to 250 bar.

Therefore, use is made of a surfactant composition which comprises an aqueous solution, or carbon dioxide, or a mixture of aqueous solution and carbon dioxide, and which further comprises at least one surfactant compound of formula (I).

According to some embodiments, the surfactant composition comprises a single surfactant compound of formula (I).

According to other embodiments, the surfactant composition comprises a plurality of (i.e. at least two) surfactant compounds of formula (I). In particular, the surfactant composition may comprise a statistical distribution of compounds of formula (I), as can be obtained for instance starting from a natural oil. It has been found that mixtures of surfactant compounds of formula (I) may provide better performances in EOR than single compound formulations, due to different individual physicochemical properties of the compounds.

In particular, in some of these embodiments, the surfactant composition comprises a plurality of surfactant compounds of formula (II). In preferred variants, A, $R_2$, $R_3$ and $R_4$ are the same for the plurality of surfactant compounds, and $R_1$ is a different alkyl group. In more preferred variants, A is $C_3H_6$, $R_2$ is H, $R_3$ and $R_4$ are methyl groups in the various surfactant compounds of formula (II), while $R_1$ is a different alkyl group, such as in particular an alkyl group (preferably a linear alkyl group) comprising 8 to 16 carbon atoms or comprising 12 to 14 carbon atoms.

The amount of surfactant compound(s) of formula (I) in the surfactant composition is preferably from 500 to 50,000 ppm, and more preferably from 1,000 to 20,000 ppm (w/v).

The surfactant composition may also comprise one or more additives. Such additives may include additional surfactants (not according to formula (I)), salts, sacrificial agents, mobility control polymers, pH adjustment agents, solvents and mixtures thereof.

Additional surfactants may notably include cationic and/or nonionic surfactants, and for instance ammonium cationic surfactants.

According to some embodiments, the surfactant composition is a buffered aqueous solution, which makes it possible to more precisely control the physicochemical properties of the surfactant compounds. The pH of the surfactant composition is thus preferably from 4 to 8, more preferably from 5 to 7 and even more preferably from 5.5 to 6.5 or from 6.5 to 7.5.

According to some embodiments, the surfactant composition is a brine solution, having a salinity of from 70 to 300 g/L, preferably from 120 to 220 g/L.

It has been surprisingly found that the solubility of the surfactants of the invention is generally larger in more saline solutions than in less saline solutions. Thus, the solubility of these surfactants can be enhanced by increasing the salinity of the surfactant composition.

This is different to what is usually observed with traditional surfactants used in EOR processes, the solubility of which decreases with increasing salinity. Thus, traditionally, in order to enhance the solubility of a surfactant in a reservoir having a high salinity, a low salinity aqueous solution is injected to pre-flush the reservoir.

In contrast, in order to enhance the solubility of the surfactants of the invention, economic inorganic salts may be added to the surfactant composition (in particular aqueous solution) of the invention, which is more economic than traditional water purification and pre-flush. The amount of salts in the surfactant composition may be adjusted so that the surfactant is dissolved at a temperature from 60 to 150° C., preferably from 80 to 130° C. and more preferably from 100 to 120° C.

Salts which may be present in the (preferably aqueous) surfactant composition notably include sodium chloride, sodium bromide, sodium nitrate, sodium sulfate and combinations thereof. The amount of these salts in the (preferably aqueous) surfactant composition may for instance range from 70 to 300 g/L, preferably from 120 to 220 g/L.

Furthermore, it has been found that the enhancement of the solubility of these surfactants is predominantly related to the anions present in the surfactant composition and is generally relatively insensitive to the cations present in the surfactant composition.

Examples of efficient anions for enhancing the solubility of the surfactants are: nitrate or bromide ions, chloride ions and sulfate ions (ranked from most effective to least effective).

Accordingly, in some embodiments, the (preferably aqueous) surfactant composition of the invention comprises nitrate ions in a molar concentration of from 0.1 to 0.3 M, or from 0.3 to 0.5 M, or from 0.5 to 1 M, or from 1 to 1.5 M, or of more than 1.5 M.

In other embodiments, the (preferably aqueous) surfactant composition of the invention comprises bromide ions in a molar concentration of from 0.1 to 0.3 M, or from 0.3 to 0.5 M, or from 0.5 to 1 M, or from 1 to 1.5 M, or of more than 1.5 M.

In other embodiments, the (preferably aqueous) surfactant composition of the invention comprises chloride ions in a molar concentration of from 0.1 to 0.3 M, or from 0.3 to 0.5 M, or from 0.5 to 1 M, or from 1 to 1.5 M, or of more than 1.5 M.

In other embodiments, the (preferably aqueous) surfactant composition of the invention comprises sulfate ions in a molar concentration of from 0.1 to 0.3 M, or from 0.3 to 0.5 M, or from 0.5 to 1 M, or from 1 to 1.5 M, or of more than 1.5 M.

Several of the above anions may be combined together. The total anion concentration in the (preferably aqueous) surfactant composition of the invention may range from 0.1 to 0.3 M, or from 0.3 to 0.5 M, or from 0.5 to 1 M, or from 1 to 1.5 M, or may be more than 1.5 M.

Divalent cations are believed to be less desirable as counterions to the above anions than monovalent cations. Sodium cations are especially preferred as counterions.

Accordingly, in some embodiments, the surfactant composition of the invention comprises sodium nitrate and/or sodium bromide and/or sodium chloride and/or sodium sulfate. The amount of these salts can be adjusted so as to provide the anions molar concentration ranges mentioned above.

The solubility of the surfactants of the invention in $CO_2$ is believed to be independent of salinity. As shown in the example section below, at low salinity and high temperature, the surfactants of the invention tend to be insoluble in an aqueous phase but soluble in a $CO_2$ phase.

Controlling or adjusting the salinity of the injected aqueous solution thus makes it possible to control or adjust the solubility of the surfactant and thus to control or adjust the partitioning coefficient between water and carbon dioxide; and to control or adjust the generation and strength of the emulsion. When the salinity is low, the emulsion generated by the surfactant(s) of the invention tends to be relatively weak; and when the salinity is high, the emulsion generated by the surfactant(s) of the invention tends to be relatively strong.

In particular, by injecting carbon dioxide and a low salinity brine into a hot subterranean formation, the surfactants of the invention may be transported in the $CO_2$ phase, be delivered into the depths of the subterranean formation, and generate an emulsion.

Accordingly, the process of the invention may comprise the injection of a surfactant composition comprising the surfactant(s) of the invention in liquid or supercritical $CO_2$, and the injection of an aqueous solution having a low salinity, into the subterranean formation. These injections may be simultaneous, successive or alternated. The low salinity aqueous solution may for instance contain:
  sulfate anions in a concentration of from 0 to 1.0 M, preferably from 0 to 0.5 M, more preferably from 0 to 0.3 M; and/or
  chloride anions in a concentration of from 0 to 1.0 M, preferably from 0 to 0.5 M, more preferably from 0 to 0.3 M; and/or
  bromide anions in a concentration of from 0 to 0.5 M, preferably from 0 to 0.3 M, more preferably from 0 to 0.15 M; and/or
  nitrate anions in a concentration of from 0 to 0.5 M, preferably from 0 to 0.3 M, more preferably from 0 to 0.15 M; and/or
  chloride, sulfate, bromide and/or nitrate anions in a total concentration of from 0 to 1.0 M, preferably from 0 to 0.5 M, more preferably from 0 to 0.3 M; and/or
  anions in a total concentration of from 0 to 1.0 M, preferably from 0 to 0.5 M, more preferably from 0 to 0.3 M.

When the salinity of the injected aqueous solution is low, the emulsion tends not to be readily generated close to the injection well(s). But salinity is higher in the depth of the subterranean formation, due to the high salinity of the reservoir brine. Therefore, the emulsion tends to be generated in the depth of the reservoir.

Alternatively, or additionally, the process of the invention may comprise the injection of a liquid or supercritical $CO_2$, and the injection of an aqueous solution having a high salinity, into the subterranean formation. The surfactant(s) of the invention may then be present in the $CO_2$ or in the aqueous solution or both. These injections may be simultaneous, successive or alternated. The high salinity aqueous solution may for instance contain:
  sulfate ions in a molar concentration of from 0.1 to 0.3 M, or from 0.3 to 0.5 M, or from 0.5 to 1 M, or from 1 to 1.5 M, or of more than 1.5 M; and/or
  chloride ions in a molar concentration of from 0.1 to 0.3 M, or from 0.3 to 0.5 M, or from 0.5 to 1 M, or from 1 to 1.5 M, or of more than 1.5 M; and/or
  bromide ions in a molar concentration of from 0.1 to 0.3 M, or from 0.3 to 0.5 M, or from 0.5 to 1 M, or from 1 to 1.5 M, or of more than 1.5 M; and/or
  nitrate ions in a molar concentration of from 0.1 to 0.3 M, or from 0.3 to 0.5 M, or from 0.5 to 1 M, or from 1 to 1.5 M, or of more than 1.5 M; and/or
  sulfate, chloride, bromide and/or nitrate ions in a total concentration of from 0.1 to 0.3 M, or from 0.3 to 0.5 M, or from 0.5 to 1 M, or from 1 to 1.5 M, or of more than 1.5 M; and/or
  anions in a total anion concentration of from 0.1 to 0.3 M, or from 0.3 to 0.5 M, or from 0.5 to 1 M, or from 1 to 1.5 M, or of more than 1.5 M;
  one or more salts (such as in particular sodium nitrate, sodium bromide, sodium chloride and/or sodium sulfate) in an amount of from 70 to 300 g/L, preferably from 120 to 220 g/L When the salinity of the injected aqueous solution is high, the emulsion tends to be generated close to the injection well(s).

In some embodiments, the salinity of the aqueous solution which is injected in the method of the invention is constant.

In other embodiments, the salinity of the aqueous solution which is injected in the method of the invention may vary over time. This makes it possible to deliver the surfactant deeper in the reservoir and to more efficiently generate an emulsion or foam, while maintaining good injectivity.

Accordingly, successive injections of aqueous solutions having different salinities may be performed. The injection of an aqueous solution having a lower salinity may thus be followed by the injection of an aqueous solution having a higher salinity. Or the injection of an aqueous solution having a higher salinity may be followed by the injection of an aqueous solution having a lower salinity. Or injections of aqueous solutions having a higher salinity and of aqueous solutions having a lower salinity may alternate. More than two different salinities may be used. The surfactant(s) of the invention may be added only to the carbon dioxide. Alternatively, they may be added only to the aqueous solution(s) having a higher salinity. Alternatively, they may be partly added to the carbon dioxide, and partly added to the aqueous solution(s) having a higher salinity.

In some embodiments, at least part of the surfactant compound(s) of formula (I) are recovered in the stream of collected hydrocarbons. This part of surfactant compounds can advantageously be separated from the hydrocarbons so as to be recycled and reused.

In addition to carbon dioxide EOR, the above surfactant compounds of formula (I) can also be used in other EOR processes, such as chemical EOR processes (such as Surfactant Flooding, Surfactant and Polymer Flooding, Alkaline-Surfactant-Polymer Flooding), gas EOR processes (using e.g. $N_2$, natural gas or $CO_2$) and thermal processes (such as Steam Flooding).

Furthermore, the above surfactant compounds of formula (I) can also be useful additives for transporting collected hydrocarbons, as they can provide an anti-agglomerate function. Accordingly, the invention also relates to a method of extracting hydrocarbons from a subterranean formation, comprising:
  injecting a surfactant composition as described above into the subterranean formation,
  collecting hydrocarbons displaced by the injected surfactant composition, and
  transporting the collected hydrocarbons containing said surfactant composition.

Preparation of Compounds of Formula (I)

Compounds of formula (I), in particular those for which x=0, may be synthesized by reducing compounds having the same formula, except that one of the alkyl groups is replaced by a corresponding acyl group which therefore forms an amide bond with the neighboring nitrogen atom.

By way of example, the preferred compound $N^1$-dodecyl-$N^3,N^3$-dimethylpropane-1,3-diamine can be reduced from dodecylamidopropyl dimethylamine according to the following reaction scheme:

A similar reduction reaction can also be performed starting from a complex mixture, such as cocamidopropyl dimethylamine (which is a mixture of amide compounds, predominantly having a C8-C16 alkyl chain).

The reduction reaction may be performed in the presence of sodium bis(2-methoxyethoxy)aluminumhydride in toluene. Other possible reducing agents include LiAlH$_4$ and NaBH$_4$.

The amide starting compounds may be obtained by reacting the corresponding carboxylic acid and amine. For instance dodecylamidopropyl dimethylamine may be obtained by reacting the carboxylic acid of the following formula:

with the diamine of the following formula:

The amidation reaction may be e.g. performed in the presence of a coupling agent such as 2-(1H-benzotriazol-1-yl)-1,1,3,3-tetramethyluronium hexafluorophosphate, of a base such as triethylamine, and in a solvent such as dimethylformamide and/or tetrahydrofurane.

EXAMPLES

The following examples illustrate the invention without limiting it.

Example 1—Surfactants According and not According to the Invention

In this example, experiments were conducted within a slim tube packed with sand. The tube length was 25 cm, the tube diameter was 1 cm. The packed sand had a total pore volume of 6.55 mL and a permeability of 16.8 darcy.

Various surfactant compositions were made by dissolving 0.2 wt. % of an individual surfactant compound in brine having a NaCl content of 220 g/L, buffered at pH=6 with a sodium acetate/acetic acid buffer.

Carbon dioxide and the surfactant brine composition were co-injected into the slim tube via two separate inlets, at a temperature of 25° C. and at a pressure of 150 bar, with a total flow rate of 60 ft/day and a carbon dioxide fraction of 50%.

The pressure drop across the tube was measured and the apparent viscosity was calculated based on Darcy's law.

The following individual surfactant compounds were tested:
A: no surfactant, pure water (control).
B: nonyl phenol ethoxylate in brine (comparative).
C: bis-(2-hydroxyethyl) coconut alkylamine, marketed by Akzo Nobel as Ethomeen® C12, in brine (comparative).
D: dodecylamidopropyl dimethylamine, in brine (comparative).
E: $N^1$-dodecyl-$N^3$,$N^3$-dimethylpropane-1,3-diamine, in brine (invention).

In this example, compound D was synthesized from pure chemicals (lauric acid and propanediamine), and compound E was prepared from compound D, according to the process described above.

Figure 1:
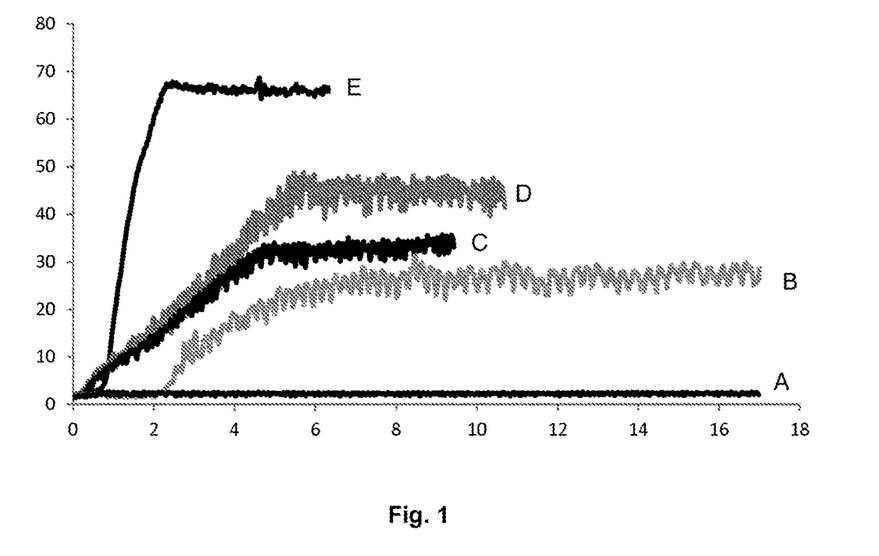
FIG. 1 shows the rise in apparent viscosity (on the Y-axis, in cP) achieved when various surfactant compositions are co-injected with carbon dioxide in a slim tube experiment. The injected volume is on the X-axis, expressed in pore volumes. For more details, see example 1 below.

The results of the experiments are shown on FIG. 1. Compound E according to the invention provides a quicker and higher rise in viscosity and is therefore deemed to be more effective than comparative surfactant compounds in an EOR process.

It is believed that the benefit offered by compound E may be even greater at lower permeability and/or higher temperature, i.e. in conditions closer to those of some actual subterranean formations.

In addition to the above, it should be noted that amide compounds such as compound D are not stable at high temperature.

Example 2—Various Surfactants According to the Invention

In this example, similar experiments to those of example 1 were conducted in a slim tube. In this case, three different surfactant compositions according to the invention were used and tested at different temperatures. All surfactant compositions were made with 0.2 wt. % surfactant in brine having a NaCl content of 220 g/L, buffered at pH=6 with a sodium acetate/acetic acid buffer:
Composition A: $N^1$-dodecyl-$N^3$,$N^3$-dimethylpropane-1,3-diamine (pure compound E of example 1), in brine.
Composition B: mixture of compounds obtained by reducing cocamidopropyl dimethylamine in brine. The mixture contains not only compound E of example 1 (alkyl chain in C12) but more generally similar compounds having alkyl chains of various lengths (mainly C8-C16 and more particularly C12-C14). This composition was purified by passing in a silica chromatography column to remove organic solvents and by-products in the reducing reaction.
Composition C: same as composition B, except that no purification step was performed.

Figure 2:
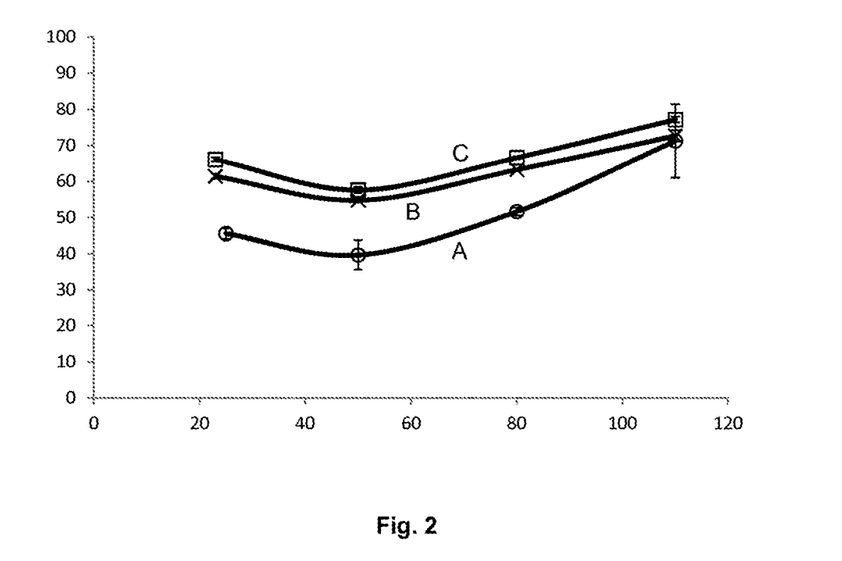
FIG. 2 shows the final apparent viscosity (on the Y-axis, in cP) achieved when various surfactant compositions are co-injected with carbon dioxide in a slim tube experiment. The temperature applied (in ° C.) is on the X-axis. For more details, see example 2 below.

The results of the experiments are shown on FIG. 2. The data corresponds to the stabilized apparent viscosity after the transient regime (plateaued apparent viscosity) as a function of temperature.

The first observation is that the performance of the surfactant compositions of the invention does not decrease at high temperature, and in some cases even improves at high temperature.

The second observation is that mixtures of compounds according to the invention tend to be more efficient than single compounds.

Example 3—Effect of Salinity

Several compositions similar to composition C in example 2 were prepared, containing 0.2 wt. % of surfactant in aqueous solutions of salinities at pH=8. The solutions were heated from 25 to 120° C.

Figure 3:
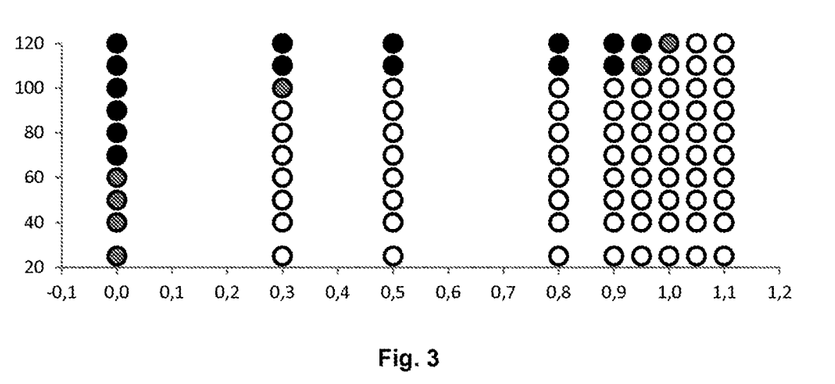
FIG. 3 shows the solubility of aqueous compositions containing a surfactant of the invention, at different temperatures (on the Y-axis, in ° C.), depending on the concentration in sodium chloride (on the X-axis, in mol/L), at pH=8. White hollow circles indicate a clear, dissolved composition, grey circles indicate a hazy, partly dissolved composition, and black solid circles indicate a cloudy, undissolved composition.

The experimental results are shown in FIG. 3. The surfactant is not soluble in the aqueous phase without any salinity from 25 to 120° C., but gets more and more soluble with increasing salinity.

Additionally, 0.2 wt. % of surfactant was initially dissolved in $CO_2$ phase at 250 bar and various temperatures. Then, the pressure was slowly decreased by enlarging the volume of the $CO_2$. When the clear $CO_2$ phase becomes cloudy, the surfactant is not soluble in $CO_2$ anymore. This critical pressure is the cloud point pressure. The cloud point pressure at various temperatures was measured.

Figure 4:
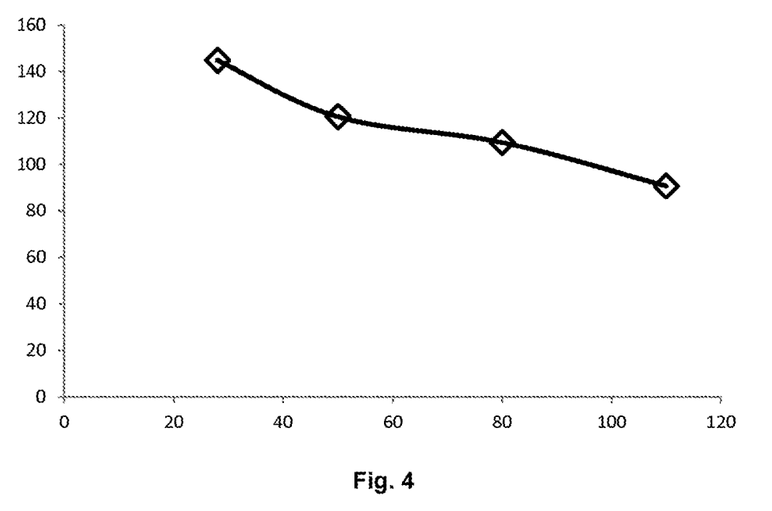
FIG. 4 shows the solubility of a surfactant of the invention in a $CO_2$ phase, at different pressures (on the Y-axis, in bar), depending on temperature (on the X-axis, in ° C.). The square marks indicate the cloud point pressure above which the $CO_2$ phase is clear, below which the $CO_2$ phase is cloudy.

The experimental results are shown in FIG. 4. The surfactant is dissolved in the $CO_2$ phase at pressures higher than the cloud point pressure. The solubility of the surfactant in the $CO_2$ phase is independent of the salinity, and is enhanced by temperature.

Therefore, when the surfactant is injected with $CO_2$ and aqueous solution having a low salinity, the surfactant preferentially dissolves in the $CO_2$ at high temperature. The surfactant can thus be transferred into the $CO_2$ phase in the reservoir, until it meets the high salinity reservoir brine.

Furthermore, 0.2 wt % surfactant compositions having different salinities and having a pH of 6 (adjusted with a sodium acetate/acetic acid buffer) were co-injected with $CO_2$ into the slim tube of example 1:

Composition A: $N^1$-dodecyl-$N^3,N^3$-dimethylpropane-1,3-diamine in deionized water (salinity=0).

Composition B: $N^1$-dodecyl-$N^3,N^3$-dimethylpropane-1,3-diamine in 220 g/L NaCl brine.

Figure 5:
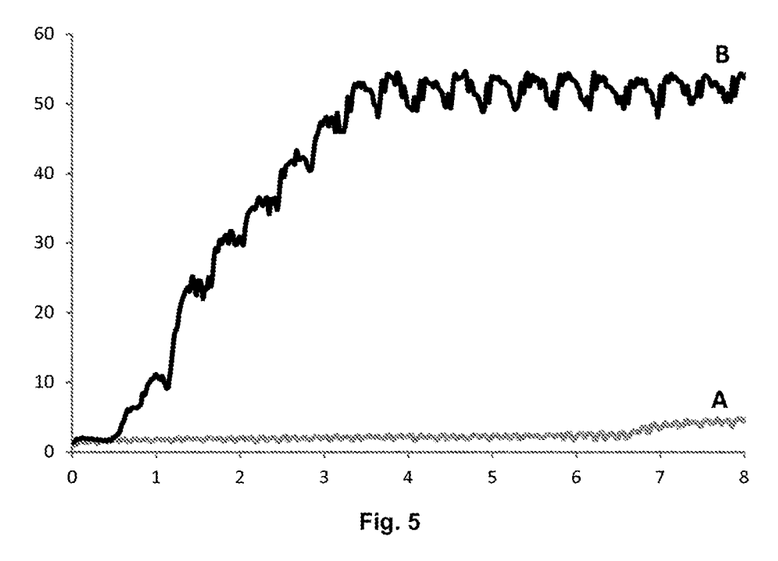
FIG. 5 shows the rise in apparent viscosity (on the Y-axis, in cP) achieved when a surfactant composition of the invention in deionized water (A) and in 220 g/L NaCl brine (B) is co-injected with carbon dioxide, respectively, in a slim tube experiment. The injected volume is on the X-axis, expressed in pore volumes. For more details, see example 3 below.

The experimental results are shown in FIG. 5. A strong emulsion can be readily generated in 220 g/L NaCl brine, but cannot in deionized water. Thus, the generation of the strong emulsion can be controlled by salinity. The strong emulsion can be generated near the injection well by injecting high salinity brine. And the strong emulsion can be generated far away from the injection well by injecting low salinity brine.

The invention claimed is:

1. A method of extracting hydrocarbons from a subterranean formation, comprising:
    injecting a surfactant composition into the subterranean formation, and
    collecting hydrocarbons displaced by the injected surfactant composition;
    wherein the surfactant composition comprises at least one surfactant compound of formula (I):

(I)

wherein x is an integer from 0 to 3, $R_1$, $R_2$, $R_3$, $R_4$ and each R are independently a hydrogen atom or an alkyl group, each A is an alkylene group, and the total number of carbon atoms in the surfactant compound of formula (I) is from 10 to 21.

2. The method of claim 1, wherein the total number of carbon atoms in the surfactant compound of formula (I) is from 17 to 19, and/or wherein x is 0.

3. The method of claim 1, wherein each R is a hydrogen atom and/or wherein each A comprises from 1 to 5 carbon atoms.

4. The method of claim 1, wherein at least one of $R_1$, $R_2$, $R_3$ and $R_4$ is a hydrogen atom or wherein at least one of $R_1$, $R_2$, $R_3$ and $R_4$ is an alkyl group comprising from 8 to 16 carbon atoms.

5. The method of claim 1, wherein $R_1$, $R_2$, $R_3$ and $R_4$ are independently selected from a hydrogen atom and linear alkyl groups.

6. The method of claim 1, wherein at least one of $R_1$, $R_2$, $R_3$ and $R_4$ is a methyl group.

7. The method of claim 1, wherein x is 0, A comprises 3 carbon atoms, $R_1$ is an alkyl group comprising from 6 to 16 carbon atoms, $R_2$ is a hydrogen atom, $R_3$ is a methyl group and $R_4$ is a methyl group.

8. The method of claim 1, wherein the surfactant composition is an aqueous solution and/or wherein the surfactant composition comprises liquid or supercritical carbon dioxide.

9. The method of claim 8, wherein the aqueous solution contains inorganic salts from sodium chloride, sodium sulfate, sodium nitrate and/or sodium bromide.

10. The method of claim 1, comprising successive or alternating steps of injecting one or more aqueous solutions and of injecting liquid or supercritical carbon dioxide into the subterranean formation, or comprising steps of simultaneously injecting one or more aqueous solutions and of injecting liquid or supercritical carbon dioxide into the subterranean formation, wherein the at least one surfactant of formula (I) is present in one or more of the aqueous solutions; and/or is present in the liquid or supercritical carbon dioxide.

11. The method of claim 10, comprising steps of injecting different aqueous solutions having different salinities.

12. The method of one of claim 10, wherein one or more of the aqueous solutions comprise inorganic salts selected from sodium chloride, sodium sulfate, sodium nitrate and/or sodium bromide.

* * * * *